June 3, 1952  B. R. SIMONS  2,598,844
COLLAPSIBLE BABY BED
Filed Dec. 23, 1949  2 SHEETS—SHEET 1

Inventor
Bert R. Simons
By John N. Randolph
Attorney

June 3, 1952        B. R. SIMONS        2,598,844
COLLAPSIBLE BABY BED
Filed Dec. 23, 1949        2 SHEETS—SHEET 2
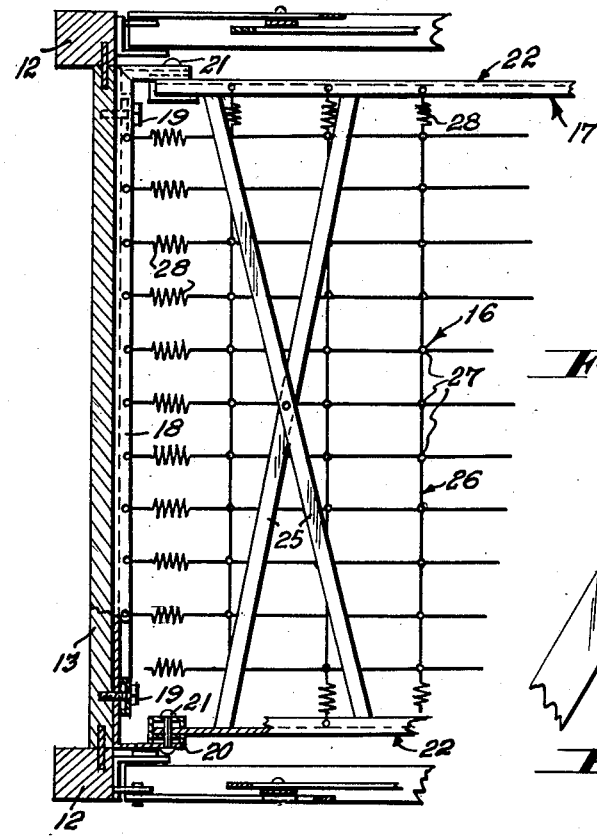
Fig. 5.
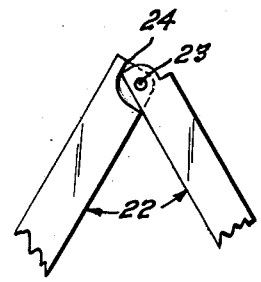
Fig. 6.
Fig. 7.
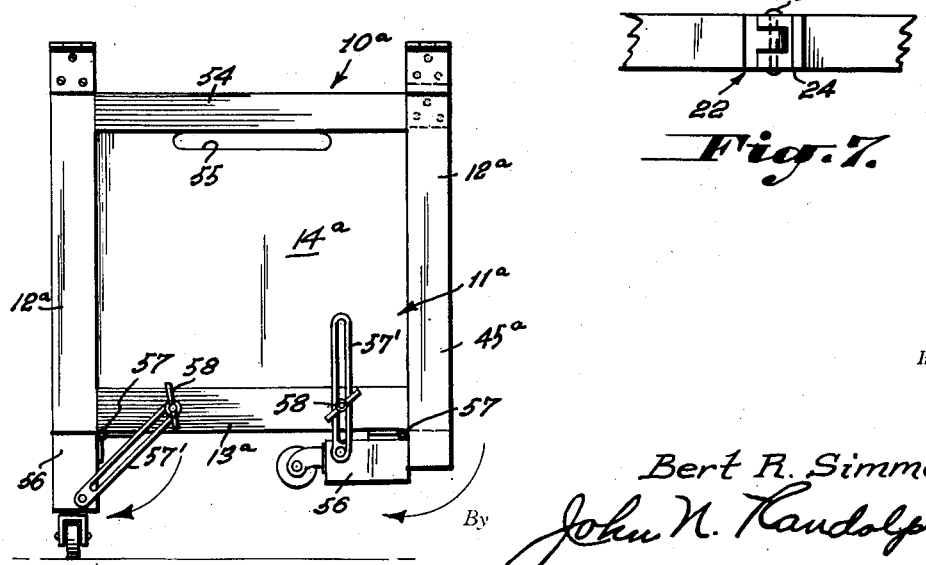
Fig. 8.
Inventor
Bert R. Simmons
By John N. Randolph
Attorney Patented June 3, 1952

2,598,844

UNITED STATES PATENT OFFICE 2,598,844

COLLAPSIBLE BABY BED

Bert R. Simons, Bartow, Fla., assignor of one-half to J. P. Robinson, Mobile, Ala.

Application December 23, 1949, Serial No. 134,770

4 Claims. (Cl. 5—99)

This invention relates to a novel construction of collapsible baby bed which may be safely utilized by young children which are able to stand and walk without danger of injury to the child and which is so constructed that the bed may be quickly and easily collapsed to enable it to be stored in a very limited space or conveniently transported without being dismantled.

More particularly, it is an object of the present invention to provide a collapsible baby bed having collapsible latticework sides of a modified lazy tong construction to enable the bed to be readily collapsed when not in use.

A further object of the invention is to provide means for limiting the extent that the sides of the bed may be extended and which affords a guard means to prevent a child from sticking its head through the openings of the latticework sides and possibly being injured thereby.

Still a further object of the invention is to provide a bed having hinged top rails capable of being locked in extended positions for positively holding the bed in a fully extended position and which afford guards for the upper ends of the latticework sides of the bed to prevent injury to the child thereby.

Still another object of the invention is to provide a bed having corner posts including foldable leg sections for further restricting the overall size of the bed when in a collapsed position.

Numerous other objects and advantages of the invention will hereinafter become more fully apparent from the following description of the drawings illustrating presently preferred embodiments thereof, and wherein:

Figure 5 is an enlarged horizontal sectional view taken substantially along a plane as indicated by the line 5—5 of Figure 1;

Figure 6 is a fragmentary side elevational view of a portion of the bed spring frame shown in a folded or collapsed position;

Figure 7 is a top plan view of said frame portion;

Figure 8 is a view similar to Figure 3 but illustrating a slightly modified form of the bed.

Figure 1:
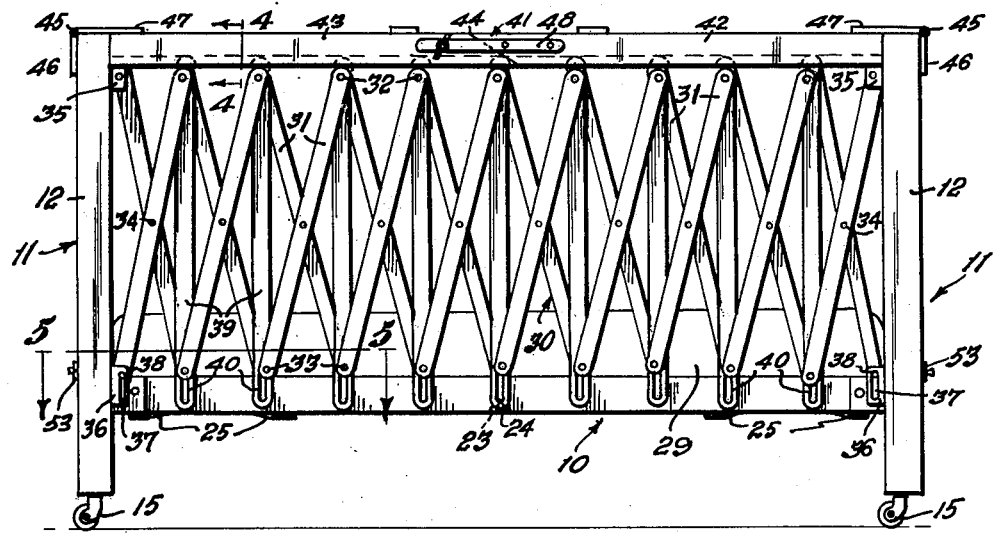
Figure 1 is a side elevational view showing one form of the bed in an extended position.
Figures 2, 3:
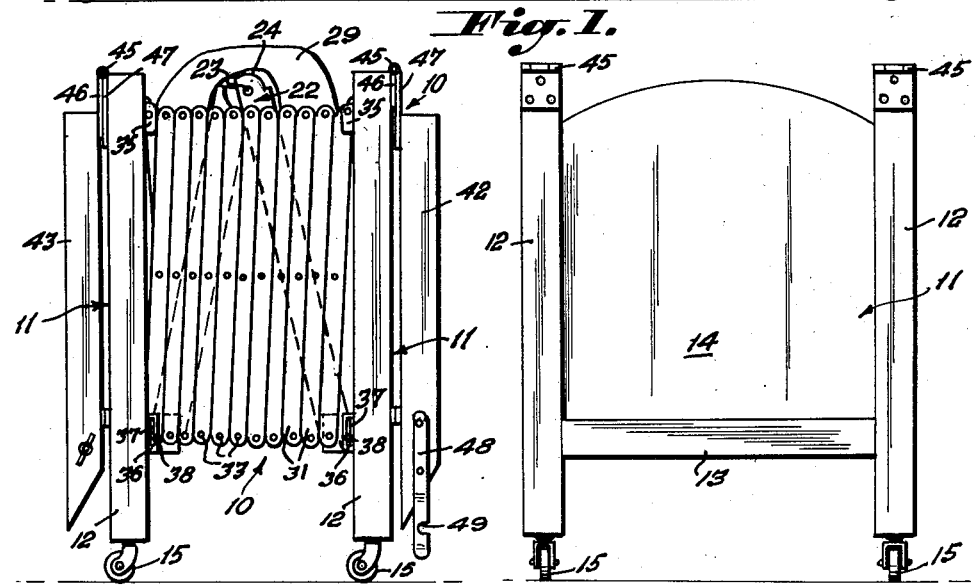
Figure 2 is a similar view showing the bed in a collapsed position.
Figure 3 is an end elevational view looking toward either end of the bed as seen in Figure 1.

Referring more specifically to the drawings and first with reference to the embodiment of the invention as illustrated in Figures 1 to 7 and 9, the collapsible bed in its entirety and comprising the invention is designated generally 10 and preferably includes corresponding end portions, designated generally 11, one of which forms the headboard and the other of which forms the footboard of the bed. As seen in Figure 3, each of said end portions 11 includes two upright corner posts 12 which are connected near but spaced from their lower ends by a cross bar 13. Each end member 11 also includes a panel 14 which is suitably secured between the corner posts 12 and above the cross bar 13. The lower ends of the corner posts 12 which extend beneath the cross bar 13 form the legs of the bed 10 and are preferably each provided with a depending caster wheel 15.

The bed 10 includes a bed spring, designated generally 16 and best illustrated in Figure 5. The bed spring 16 includes a frame, designated generally 17 having corresponding end portions 18 which are formed of angle iron and one of which is secured to the cross bar 13 of each end portion 11 by fastenings 19. Each end portion 18 is provided with an inturned arm 20 at each end thereof which arms are pivotally connected by fastenings 21 to complementary ends of the side members 22 of the spring frame 17. Each side member 22 is composed of corresponding end sections the adjacent ends of which are pivotally connected by a pivot pin 23 and said sections at their pivot joints 23 are shaped to form a knee joint 24, as best illustrated in Figures 6 and 7 which is capable of breaking upwardly from a horizontal position and which is prevented by abutting engagement of end portions of the sections of each side member 22 from swinging downwardly beyond a position in which the sections of the side member are disposed in straight or extended positions. The complementary sections or ends of the two frame side members 22 are connected by strap members 25 which are arranged in crossed relationship and which are substantially rigid so that the frame members 22 will swing as a unit on the pivots 21. The bed spring 16 includes the usual cross wire construction 26 formed of links which are pivotally connected together at the points 27. The ends and sides of the cross wire construction 26 is connected by coil springs 28 to the end frame portions 18 and the frame side members 22. Accordingly, it will be readily apparent that the bed spring 16 is capable of being folded to its position of Figure 2 by breaking the knee joints 23, 24 upwardly and with the end portions of the side frame members 22 pivoting at 21 on the end frame portions 18. A mattress 29 which is supported on the bed spring 16 is folded upwardly with the bed spring when the bed 10 is collapsed, as illustrated in Figure 2.

The bed 10 is provided with corresponding latticework sides, each designated generally 30 and each including a plurality of slats 31 which are pivotally connected in a lazy tong construction at their upper ends by pivot pins 32, at their lower ends by pivot pins 33 and intermediate of their ends and in crossed relationship by pivot pins 34, which pivots 32, 33 and 34 are preferably rivets. The ends of each lazy tong construction are pivotally connected at the upper edge of each latticework side to a bracket 35 which is secured to a corner post 12 near the upper ends of the corner posts. Each corner post 12 is also provided at approximately the level of the bed spring 16 with a lower bracket 36 having a vertically elongated slot 37 for slidably receiving a pivot pin 38 connected to an end and lower edge of the latticework construction 30. Each latticework construction 30 also includes in addition to the slats 31, a plurality of vertically disposed slats 39. The upper end of each slat 39 is pivotally connected to one of the pivots 32 and the lower end of each slat 39 is provided with a vertically elongated slot 40 for slidably receiving one of the pivots 33.

The bed 10 is provided with top rails 41 which extend longitudinally of the bed and each of which is composed of the end rail sections 42 and 43 having the mitered interfitting adjacent ends 44. The remote ends of the complementary sections 42 and 43 are connected by hinges 45 to the corresponding corner posts 12 of the two bed portions 11. Each hinge 45 includes a short hinge leaf 46 which is secured to the outer side of its corner post 12 and a longer leaf 47 which extends across the upper end of said corner post and is secured to the upper edge of the rail section 42 or 43. Each rail section 42 carries a latch bar 48 which extends across its mitered end and which has a downwardly opening notch 49 to engage a stud 50 which projects from the complementary rail section 43. A wing nut 51 which threadedly engages the stud 50 is adapted to be tightened for securing the latch bar 48 to the rail section 43 for retaining the rail 41 in an extended position as illustrated in Figure 1.

Figure 4:
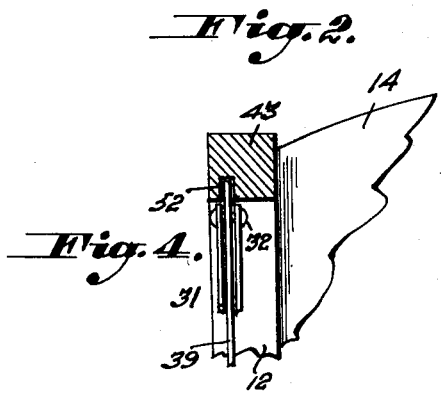
Figure 4 is an enlarged transverse vertical sectional view taken substantially along a plane as indicated by the line 4—4 of Figure 1.
Figure 9:
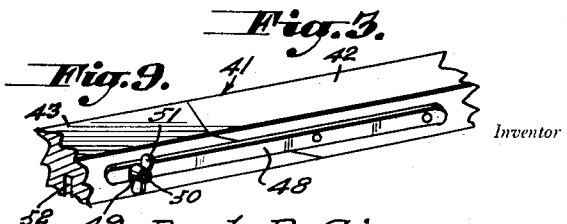
Figure 9 is an enlarged, fragmentary perspective view of a portion of one of the top rails of the bed.

It will be readily apparent that when the rails 41 are latched in extended positions, as previously described, the bed 10 will be retained in its extended position of Figure 1 and said rails 41 are provided with longitudinally extending downwardly opening grooves 52 for receiving the upper ends of the slats 39 and adjacent which the upper ends of the slats 31 are disposed, as best seen in Figure 4, so that a child will thereby be prevented from injuring itself on the latticework sides 30 of the bed 10. By loosening the wing nut 51, the top rail sections 42 and 43 may be swung upwardly and around the bed posts 12 to depending positions on the outer sides of said bed posts, as illustrated in Figure 2 and the bed posts and rail sections 42 and 43 carry complementary latch sections 53 by which the rail sections 42 and 43 may be latched in their depending positions on the outer sides of the bed posts, and as illustrated in Figure 2. Thereafter, the knee joints 23, 24 may be broken for folding the bed spring 16 upwardly and so that the bed may be collapsed as illustrated in Figure 2 and with the latticework sides 30 thereof collapsing in the manner as illustrated in Figure 2. It will be readily obvious that the length of the bed 10 may be varied by varying the length of the slots 37 and 40, the length of the bed spring 16 and rails 41 so that the bed 10 may be made of a conventional length of approximately three and one-half feet or may be longer or shorter than such length. The vertical slats 39 additionally function to prevent a child from sticking its head through the openings in the slats 31 and thus combine with the guard rails 41 to prevent a child from injuring itself on the latticework sides 30. When the bed 10 is folded as illustrated in Figure 2, it may be readily stored in a restricted space or may be readily transported without the necessity of dismantling the bed in any way.

Figure 8 illustrates a slightly modified form of the bed and wherein the end members 11a differ from the end members 11 in that the corner posts 12a are braced by an upper cross bar 54 in addition to the lower cross bar 13a and the panel 14a is interposed between the cross bars 13a and 54 and is provided adjacent its upper end with a slot 55 which combines with the top cross bar 54 to form a hand hold. Additionally, the corner posts 12a are provided with separate bottom sections or legs 56 which extend from below the level of the bottom cross bar 13a and which are hinged to said bottom cross bar by hinges 57 so that the legs 56 may be disposed in depending positions as illustrated at the left of Figure 8 when the bed is in use or may be swung inwardly and upwardly with respect to the end members 11a to a folded position as shown at the right of Figure 8 when the bed 10a is collapsed for storage. Each leg 56 likewise carries a slotted bar 57' which is pivotally connected thereto and the slot of which engages a pin and wing nut 58 which projects from the cross bar 13a and the wing nut of which may be tightened for clamping the slotted bar 57' for retaining the leg 56 in either its extended or its folded position, as illustrated in Figure 8. The end members 11a are either made slightly higher than the end members 11 or the bed 10a is shorter than the bed 10 so that the sections of the top rail, one of which is designated 43a as shown in Figure 8, will terminate above the bottommost part of the legs 56 when said legs are in a folded position, as seen in Figure 8.

Various modifications and changes are contemplated and may obviously be resorted to, without departing from the spirit or scope of the invention as hereinafter defined by the appended claims.

I claim as my invention:

1. A collapsible baby bed comprising a bedstead formed of complementary upright end members each including a pair of corner posts, a pair of corresponding latticework sides each comprising a plurality of slats pivotally connected and forming a lazy tong construction, each end of each latticework side being pivotally connected adjacent its upper edge to one of said corner posts and being pivotally and slidably connected at its lower edge to the same corner post, said bed being provided with top guard rails extending longitudinally thereof and disposed above said latticework sides, each of said guard rails comprising end sections having remote ends and abutting adjacent ends, said remote ends normally abutting corner posts of the two end members disposed adjacent the same side of the bed and being hingedly connected thereto for swinging movement to hinging positions against said corner posts and on the sides thereof opposite the sides to which the latticework sides of the bed are connected.

2. A collapsible baby bed comprising a bedstead formed of complementary upright end members each including a pair of corner posts, a pair of corresponding latticework sides each comprising a plurality of slats pivotally connected and forming a lazy tong construction, each end of each latticework side being pivotally connected adjacent its upper edge to one of said corner posts and being pivotally and slidably connected at its lower edge to the same corner post, said bed being provided with top guard rails extending longitudinally thereof and disposed above said latticework sides, each of said guard rails comprising end sections having remote ends and abutting adjacent ends, said remote ends normally abutting corner posts of the two end members disposed adjacent the same side of the bed and being hingedly connected thereto for swinging movement to hinging positions against said cornerposts and on the sides thereof opposite the sides to which the latticework sides of the bed are connected, the adjacent abutting ends of said top guard rail sections being mitered, and latch means for latching said guard rail sections in extended aligned positions between said corner posts.

3. A collapsible baby bed comprising a bedstead formed of complementary upright end members each including a pair of corner posts, a pair of corresponding latticework sides each comprising a plurality of slats pivotally connected and forming a lazy tong construction, each end of each latticework side being pivotally connected adjacent its upper edge to one of said corner posts and being pivotally and slidably connected at its lower edge to the same corner post, said bed being provided with top guard rails extending longitudinally thereof and disposed above said latticework sides, each of said guard rails comprising end sections having remote ends and abutting adjacent ends, said remote ends normally abutting corner posts of the two end members disposed adjacent the same side of the bed and being hingedly connected thereto for swinging movement to hanging positions against said corner posts and on the sides thereof opposite the sides to which the latticework sides of the bed are connected, said latticework sides including vertically disposed bars having upper ends pivotally connected to upper ends of the slats forming the lazy tong construction, said vertically disposed bars having longitudinally elongated slots adjacent their lower ends, and pivot pins pivotally connecting the lower ends of the slats of the lazy tong construction and slidably engaging the slots of said bars, said top guard rails having downwardly opening grooves for receiving the upper ends of said slats and for covering the upper ends of the bars of the lazy tong.

4. A collapsible bedstead consisting of upright end members defining a head and foot each including a pair of corner ports, latticework sides each comprising a plurality of slats pivotally connected to form a lazy tong construction each having an upper edge and a lower edge, each end of each latticework side being pivotally connected at its upper edge to one of said corner posts and being pivotally and slidably connected at its lower to the same corner post, each latticework side extending between and being connected to complementary corner posts of the two upright end members, and a pair of complementary top rails extending longitudinally of the bedstead each comprising end sections having remote ends and abutting adjacent ends, said remote ends normally abutting corner posts of the two end members disposed adjacent the same side of the bed and being hingedly connected thereto for swinging movement to hanging inoperative positions against the outer sides of said corner posts and to operative positions above the upper edges of the latticework sides and between the corner posts, said adjacent ends of the top rail sections being disposed in abutting engagement when the top rails are in operative positions to retain the upright end members in extended positions with respect to one another, and said latticework sides each including vertically disposed bars having upper ends pivotally connected to the upper ends of the slats, each of said bars having a longitudinally elongated slot adjacent its lower end to which the lower ends of two of the slats are pivotally and slidably connected for limiting the upward sliding movement of the lower ends of the slats relatively to said bars to limit the movement of the latticework sides toward extended positions.

BERT R. SIMONS.

REFERENCES CITED

The following references are of record in the file of this patent:

UNITED STATES PATENTS

| Number | Name | Date |
|---|---|---|
| 609,491 | Ashwell | Aug. 23, 1898 |
| 1,827,739 | Derbyshire | Oct. 20, 1931 |
| 2,002,607 | McDaniel | May 28, 1935 |
| 2,528,749 | Hill | Nov. 7, 1950 |

FOREIGN PATENTS

| Number | Country | Date |
|---|---|---|
| 20,422 | Denmark | Feb. 3, 1906 |
| 509,913 | France | Nov. 23, 1920 |
| 15,693 | Norway | Oct. 29, 1906 |